UNITED STATES PATENT OFFICE.

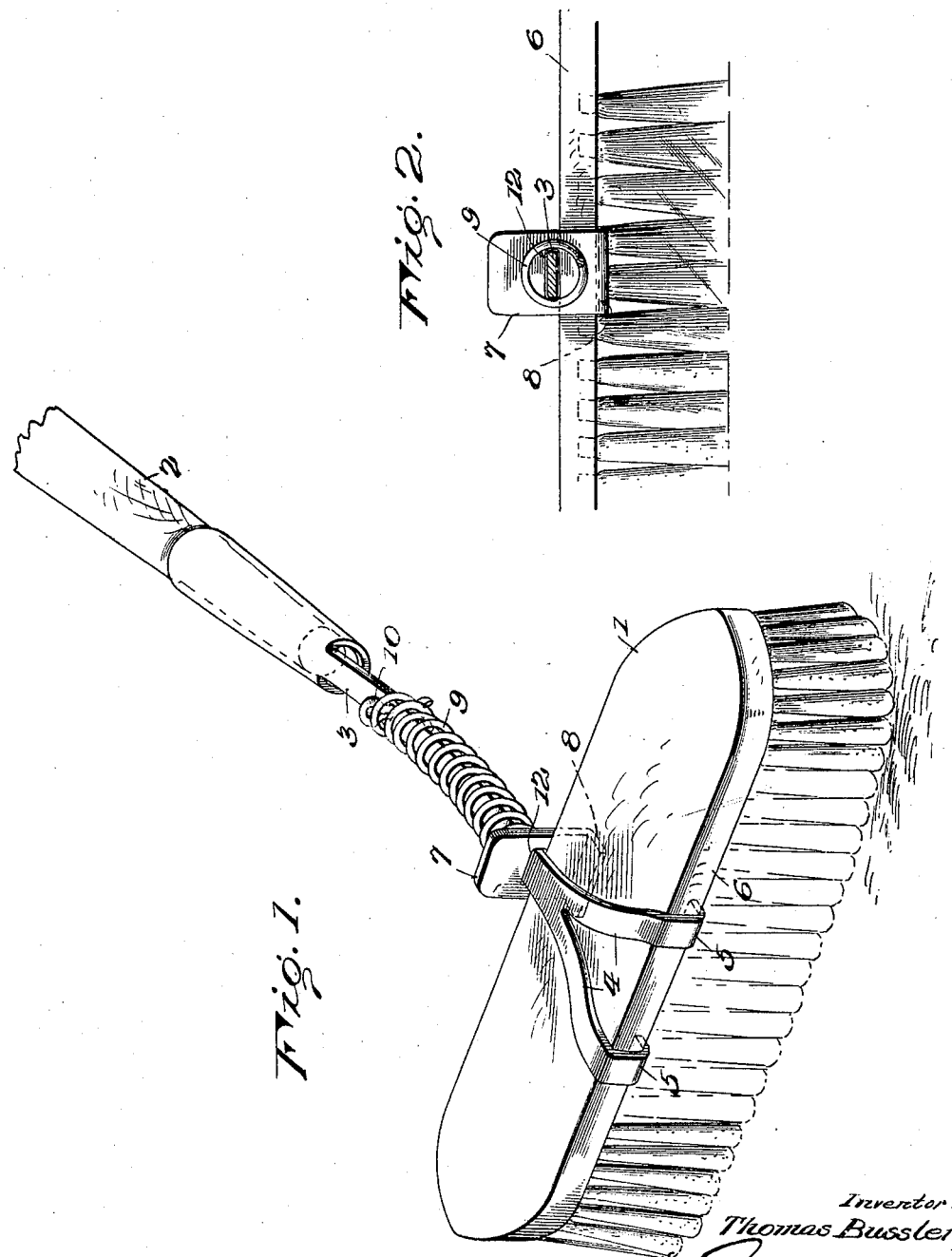

THOMAS BUSSLER, OF WHEELERSBURG, OHIO, ASSIGNOR OF ONE-HALF TO JAMES E. HANNAH AND ONE-HALF TO WALTER H. HANNAH, BOTH OF PORTSMOUTH, OHIO.

DEVICE FOR HOLDING CLEANING UTENSILS.

1,320,311.     Specification of Letters Patent.     Patented Oct. 28, 1919.

Application filed July 12, 1919. Serial No. 310,469.

*To all whom it may concern:*

Be it known that I, THOMAS BUSSLER, of Wheelersburg, in the county of Scioto and State of Ohio, have invented certain new and useful Improvements in Devices for Holding Cleaning Utensils; and I do hereby declare the following to be a full, clear, and exact description of the invention, such as will enable others skilled in the art to which it appertains to make and use the same.

My object is to provide a detachable holder for cleaning utensils having especial reference to scrubbing brushes. My primary purpose is to provide a simple and effective article which may be cheaply manufactured and which is composed of but few parts not likely to become deranged.

In the drawing, Figure 1 is a perspective view illustrating a holder attached to a brush, the holder being constructed in accordance with my invention. Fig. 2 is a cross section through the head bar and shank.

As illustrated the brush 1 is of the ordinary form of scrubbing brush, the invention being adapted to provide means for carrying the brush by an elongated handle to enable it to reach points beyond the reach of the hand of the user. I have shown a handle 2 which may be of any desired length. It is provided with a rigidly secured shank 3 which terminates at its forward extremity in a pair of diverging arms 4 formed with hooked extremities 5 adapted to clamp over the flanged head 6 of the brush.

A head bar 7 is freely movable longitudinally on the shank 3 and it is formed with a clamping edge or bill 8 similar to the extremities 5. A coiled spring 9 is wound upon the shank 3 between the pin 10 near the handle and the outer side of the head bar 7. Its function is to constantly push the head bar toward the clamping arms 4 so as to hold the brush between it and these arms.

As shown in Fig. 2 the shank is made rectangular in cross section and the aperture 12 in the head bar is of corresponding formation so that while the head bar is free to move longitudinally of the shank it will not be free to turn axially thereof.

In practice the operator has only to draw the head bar 7 along the shank 3 toward the handle 2 against the tension of the spring 9 in order to provide sufficient space between the head bar and the clamping arms 4 to permit the insertion of the brush. When this is done and the clamping extremities 5 of the arms 4 are seated over the outer edge of the brush the head bar 7 is released. Under the tension of the spring 9 its hooked extremity 8 will also engage the flanged head 6 of the brush and the latter will be effectively held as against accidental displacement.

It is manifest that a holder constructed as shown and described is effective to securely retain the brush or other cleaning utensil; likewise it is apparent that the article may be cheaply manufactured. The clamping arms 4 being formed integrally with the shank renders it necessary to only provide the freely movable head bar 7 and the spring 9 coiled upon the shank 3 in order to securely hold the brush. When it is desired to remove the brush the operator merely draws the head bar 7 toward the handle 2 in order to release the brush.

I claim as my invention:

1. A detachable brush holder comprising a handle having a shank rigidly secured relatively to the handle, a clamp rigidly fixed to said shank, a head bar movable longitudinally on said shank, and a spring coiled on said shank and constantly bearing against the outer side of said head bar to move it toward said clamp.

2. A detachable brush holder comprising a handle having a shank rigidly secured relatively to the handle and terminating in a clamp formed integrally with the shank, a head bar having an aperture to receive the shank, and movable longitudinally of the shank, means for preventing axial turning of said head bar, and a spring coiled upon the shank and bearing against the outer side of said head bar to move it toward said clamp.

3. A detachable brush holder comprising a handle having a shank terminating in a clamp formed integrally with the shank, said shank being rectangular in cross section, a head bar having a rectangular aperture to receive the shank, and a spring coiled upon the shank and bearing against said head bar to move it toward said clamp.

In testimony whereof I have signed this specification.

THOMAS BUSSLER.

Copies of this patent may be obtained for five cents each, by addressing the "Commissioner of Patents, Washington, D. C."